United States Patent Office 3,491,119
Patented Jan. 20, 1970

3,491,119
BENZOTRITHIOLANES AND THEIR
PREPARATION
Ellis K. Fields, Chicago, Ill., assignor to Standard Oil
Company, Chicago, Ill., a corporation of Indiana
No Drawing. Filed Jan. 19, 1967, Ser. No. 610,221
Int. Cl. C07d 77/00; C07c 149/28
U.S. Cl. 260—327                                    17 Claims

ABSTRACT OF THE DISCLOSURE

The benzo-1,2,3-trithiolanes and halogen substituted benzo-1,2,3-trithiolanes useful as extreme pressure additives in lubricating oils. A novel process for preparing the trithiolanes which comprises reacting polyhalobenzene with sulfur and sulfuric acid at elevated temperatures.

---

This invention relates to the sulfurization of polyhalobenzenes with sulfur and sulfuric acid. This invention further relates to a novel class of compounds, benzo-1,2,3-trithiolanes and halogen substituted benzo-1,2,3-trithiolanes.

According to my process novel halogenated trithiolanes and trithiolanes useful as extreme pressure additives in lubricating oils are produced when polyhalobenzenes are reacted with sulfur and concentrated sulfuric acid at elevated temperatures. The process of my invention consists of reacting polyhalobenzenes with sulfur and sulfuric acid at elevated temperatures. More particularly, the process of my invention consists of reacting polyhalobenzenes with sulfur and sulfuric acid in the ratio of 1 mole polyhalobenzene:1 gram atom sulfur:1 mole sulfuric acid to 1 mole polyhalobenzene:6 grams atom sulfur:40 moles sulfuric acid at a temperature of about 70 to 220° C. for a reaction time of about ½ hour to about 40 hours.

The polyhalo compounds sulfurized by the novel process have the formula $$RX_nY_m$$

where R is a benzene ring and X and Y are the same or different halogen atoms, n and m are integers from 1 to 3. Under the preferred reaction conditions, the polyhalobenzene is reacted with sulfur and sulfuric acid in the following ratio: 1 mole polyhalo compound: 1 gram atom sulfur:5 moles sulfuric acid to 1 mole polyhalobenzene:2 gram atoms sulfur:10 moles sulfuric acid at a temperature of about 150–195° C. and a reaction time from 2–10 hours.

Useful polyhalo compounds that may be sulfurized by my process are: o-difluorobenzene, m-difluorobenzene, p-difluorobenzene, o-dichlorobenzene, m-dichlorobenzene, p-dichlorobenzene, o - dibromobenzene, m - dibromobenzene, p-dibromobenzene, o-fluorochlorobenzene, m-fluorochlorobenzene, p-fluorochlorobenzene, o-fluorobromobenzene, m - fluorobromobenzene, p - fluorobromobenzene, o-chlorobromobenzene, m-chlorobromobenzene, p-chlorobromobenzene, 1,2,4-trifluorobenzene, 1,2,5-trifluorobenzene, 1,3,5-trifluorobenzene, 1,2,4-trichlorobenzene, 1,2,5-trichlorobenzene, 1,3,5-trichlorobenzene, 1,2-dichloro-4-bromobenzene, 1,3 - dichloro - 4 - bromobenzene, and 1-chloro-2,5-dibromobenzene.

The new compounds made by my process, the benzo-1,2,3-trithiolanes have the following formula:

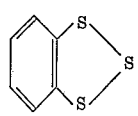

the halogen-substituted benzo-1,2,3-trithiolanes have the following formula:

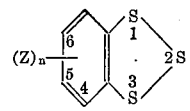

wherein Z is a halogen and n is an integer from 1 to 4.

Examples of the halogen-substituted benzo-1,2,3-trithiolanes produced by my invention are 4-fluorobenzo-1,2,3-trithiolane,
4-chlorobenzo-1,2,3-trithiolane,
4-bromobenzo-1,2,3-trithiolane,
5-fluorobenzo-1,2,3-trithiolane,
5-chlorobenzo-1,2,3-trithiolane,
5-bromobenzo-1,2,3-trithiolane,
4,7-difluorobenzo-1,2,3-trithiolane,
4-chloro-7-fluorobenzo-1,2,3-trithiolane,
4,7-dichlorobenzo-1,2,3-trithiolane,
4-bromo-7-chlorobenzo-trithiolane,
4,5-difluorobenzo-1,2,3-trithiolane,
4,5-dichlorobenzo-1,2,3-trithiolane, and
4,5-dibromobenzo-1,2,3-trithiolane.

The products of my invention are useful as extreme pressure additives. The utility is shown in Example X. These products are also useful as pesticides, dye intermediates, and as additives in lubricating oils in concentrations of 0.05–10% by weight.

The following examples are included as illustrations of my process and are not intended as limitations thereof.

EXAMPLE I

A mixture of 29.4 g. (0.2 mole) p-dichlorobenzene, 12.8 g. (0.4 g. atom) sulfur, and 100 ml. concentrated sulfuric acid was stirred at 170–175° C. for 2 hours. The cooled mixture was diluted with ice and water and the aqueous solution was decanted from a rubbery mass of 32 g. The mass was extracted with two 100 ml. portions of benzene at 40° C.; the benzene solution was distilled to give 10.5 g. orange product boiling at 178–197° C. at 0.15 mm. that analyzed C, 29.5; H, 1.1; Cl, 32.1; S, 42.0. It contained relative concentrations of these compounds (analysis by low-voltage (7.5 volts uncorrected) mass spectroscopy):

102.0

114.5

78.9

42.1

The ratios of products could be appreciably altered by varying the heating periods and the ratio of S:polyhalo compounds, as shown in the next two examples.

EXAMPLE II

The identical quantities of p-dichlorobenzene, sulfur, and sulfuric acid were stirred at 170–175° C. for 4 hours instead of 2 hours. Workup as in Example I gave 73.8 g. product that analyzed C, 39.1; H, 1.8; Cl, 33.2; S, 26.0. A portion was distilled at 145–210° C. at 0.45 mm. It contained these relative amounts of products:

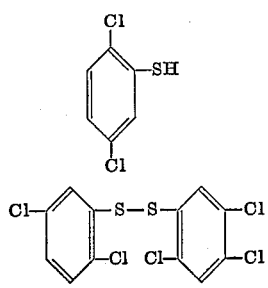

29.3

120

EXAMPLE III

A mixture of 29.4 g. (0.2 mole) p-dichlorobenzene, 6.4 g. (0.2 g. atom) sulfur, and 100 ml. concentrated sulfur acid was stirred at 170–175° C. for 4 hours. Treatment as in Example I gave 32 g. products that analyzed C, 36.7; H, 1.1; Cl, 25.9; S, 23.8. Of this a 7 g. portion was distilled to give 4.95 g. distillate boiling at 190–230° C. at 1 mm. The distillate analyzed

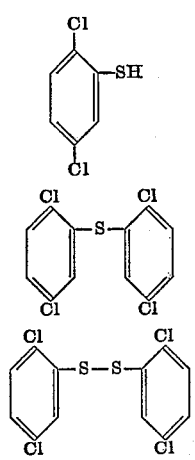

100

22

59

EXAMPLE IV

A mixture of 78.3 g. (0.6 mole) p-fluorochlorobenzene, 38.4 g. (1.2 g. atom) sulfur, and 300 ml. concentrated sulfuric acid was stirred and heated under reflux. The initial pot temperature was 132° C., reaching 170° C. after 5 hours. On treatment as in Example I, the mixture gave 37.3 g. product that contained C, 26.6; H, 1.2; Cl, 12.5; S, 51.2. Mass spectrometry gave this analysis of relative concentrations of products:

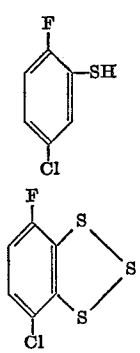

100

95

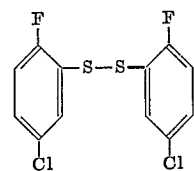

145

EXAMPLE V

A mixture of 114.9 g. (0.6 mole) p-bromochlorobenzene, 38.4 g. (1.2 g. atom) sulfur, and 300 ml. concentrated sulfuric acid was stirred at 153–166° C. for 7 hours. Treatment as in Example I gave 26 g. product that analyzed C, 28.9; H, 0.7; Br+Cl, 27.1; S, 22.6. It contained these species;

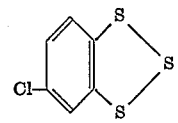

19

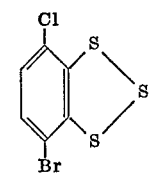

119

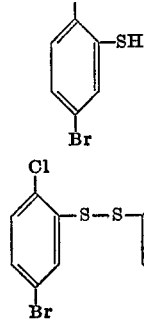

59

100

EXAMPLE VI

A mixture of 141.1 g. (0.6 mole) p-dibromobenzene, 38.4 g. (1.2 g. atom) sulfur, and 300 ml. concentrated sulfuric acid was stirred at 152–168° C. for 7 hours. Workup as in Example I gave 15.5 g. product that analyzed C, 22.4; H, 1.3; Br, 51.9; S, 22.6 and contained these compounds:

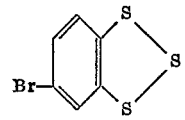

41.1

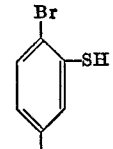

20.1

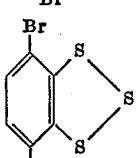

3.9

EXAMPLE VII

A mixture of 88.2 g. (0.6 mole) o-dichlorobenzene, 38.4 g. (1.2 g. atom) sulfur, and 300 ml. concentrated sulfuric acid was stirred at 157–176° for 8 hours. Treatment in Example I gave 58.2 g. o-dichlorobenzene sulfonic acid, M.P. 62°, and 3.4 g. orange product that analyzed C, 29.2; H, 1.1; Cl, 32.4; S, 37.2 and contained:

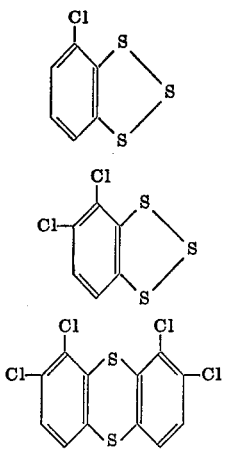

EXAMPLE VIII

A mixture of 108.9 g. (0.6 mole) 1,2,4-trichlorobenzene, 19.2 g. (0.6 g. atom) sulfur, and 300 ml. sulfuric acid was stirred at 165–170° for 5 hours. Treatment as in Example I gave 38.7 g. recovered trichlorobenzene and 68.3 g. product that analyzed C, 26.3; H, 0.7; Cl, 38.6; S, 32.2; and contained:

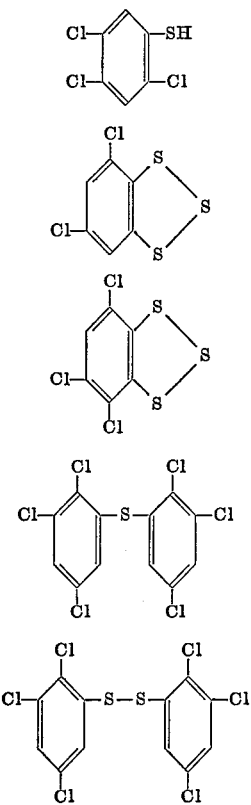

EXAMPLE IX

A mixture of 57 g. (0.5 mole) p-difluorobenzene, 32 g. (1 g. atom) sulfur, and 208 ml. (4 moles) concentrated sulfuric acid was stirred and refluxed. The initial pot temperature was 90° C.; after 93 hours it reached 184°. Treatment as in Example I gave 25.7 g. product that analyzed C, 49.0; H, 2.4; F, 25.6; S, 22.9, and contained:

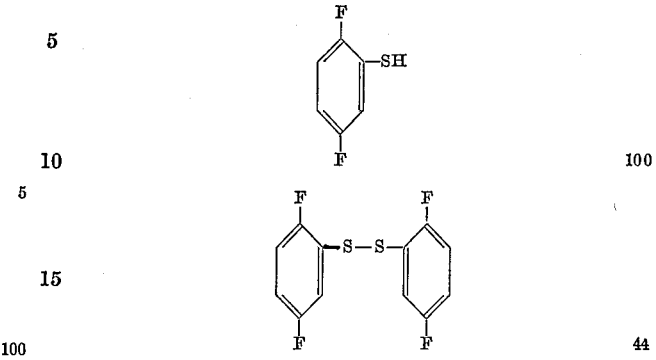

EXAMPLE X

The products of my invention were tested as extreme pressure additives in solvent-extracted 5 weight lubricating oil in an Almen machine with these results:

| Product of Example | Concentration, wt. percent | Almen test, lbs. | |
|---|---|---|---|
| | | Pass | Fail |
| Blank oil | | 4 | 6 |
| 1 | 1 | 26 | 28 |
| 4 | 1 | 20 | 22 |
| 5 | 1 | 30+ | |
| | 0.5 | 30+ | |
| | 0.25 | 14 | 16 |
| 6 | 1 | 30+ | |
| | 0.5 | 24 | 26 |
| 8 | 1 | 26 | 28 |
| 9 | 1 | 28 | 30 |

The Almen machine is a standard A.S.T.M. test for measuring the load-carrying (extreme pressure) capacities of lubricating oils. As can be seen from the table, small amounts of the products of my invention greatly increased the ability of the blank oil to carry loads, and consequently are effective extreme pressure additives.

The products of my invention can be used as pesticides, dye intermediates, and as additives in lubricating oils in concentration of 0.05–10% by weight.

What is claimed is:
1. As a new composition of matter benzo-1,2,3-trithiolane of the formula:

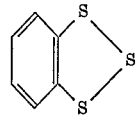

2. As a new composition of matter a halogen-substituted benzo-1,2,3-trithiolane of the formula:

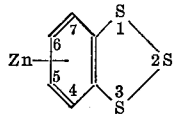

where Z is a halogen and $n$ is an integer from 1 to 4.

3. As a composition of matter 4-chlorobenzo-1,2,3-trithiolane.
4. As a composition of matter 5-chlorobenzo-1,2,3-trithiolane.
5. As a composition of matter 5-bromo-1,2,3-trithiolane.
6. As a composition of matter 4-chloro-7-fluorobenzo-1,2,3-trithiolane.
7. As a composition of matter 4,7-dichlorobenzo-1,2,3-trithiolane.
8. As a composition of matter 4-bromo-7-chlorobenzo-1,2,3-trithiolane.

9. A process for sulfurization of polyhalobenzenes which process comprises reacting a polyhalobenzene with sulfur and sulfuric acid in the mole ratio of 1 mole polyhalobenzene:1 gram atom sulfur:1 mole sulfuric acid to about 1 mole polyhalobenzene:6 gram atom sulfur:40 moles sulfuric acid at a temperature of about 70 to 220° C. for a period of ½ hour to 40 hours.

10. The process of claim 9 wherein the polyhalo compound has a formula:

$$RX_nY_m$$

wherein R is a benzene ring and X and Y are the same or different halogen atoms and $n$ and $m$ are integers from 1 to 3.

11. A process of claim 9 wherein 1 mole polyhalobenzene:1 gram sulfur:5 moles sulfuric acid to 1 mole polyhalobenzene:2 gram atoms sulfur:10 moles sulfuric acid is reacted at 150 to 195° C. for a period of about 2 to 10 hours.

12. The process of claim 9 wherein the halo compound is p-dichlorobenzene.

13. The process of claim 9 wherein the halo compound is p-fluorochlorobenzene.

14. The process of claim 9 wherein the halo compound is p-bromochlorobenzene.

15. The process of claim 9 wherein the halo compound is p-dibromobenzene.

16. The process of claim 9 wherein the halo compound is o-dichlorobenzene.

17. The process of claim 9 wherein the halo compound is p-difluorobenzene.

No references cited.

JAMES A. PATTEN, Primary Examiner

U.S. Cl. X.R.

252—45, 48.8; 260—608, 609

PO-1050
(5/69)

UNITED STATES PATENT OFFICE
CERTIFICATE OF CORRECTION

Patent No. 3,491,119          Dated January 20, 1970

Inventor(s) Ellis K. Fields

It is certified that error appears in the above-identified patent and that said Letters Patent are hereby corrected as shown below:

Column 6, Line 100, "5-bromo-1,2,3-trithiolane" should read "5-bromobenzo-1,2,3 trithiolane.

SIGNED AND
SEALED
FEB 2 1970

Feb. 2, 1970

(SEAL)
Attest:

Edward M. Fletcher, Jr.
Attesting Officer

WILLIAM E. SCHUYLER, JR.
Commissioner of Patents